G. J. BAYLIFF.
BAND SAW MACHINE.
APPLICATION FILED APR. 2, 1915.

1,260,128.

Patented Mar. 19, 1918.
2 SHEETS—SHEET 1.

Witnesses

Inventor
G. J. Bayliff.
By
Attorney

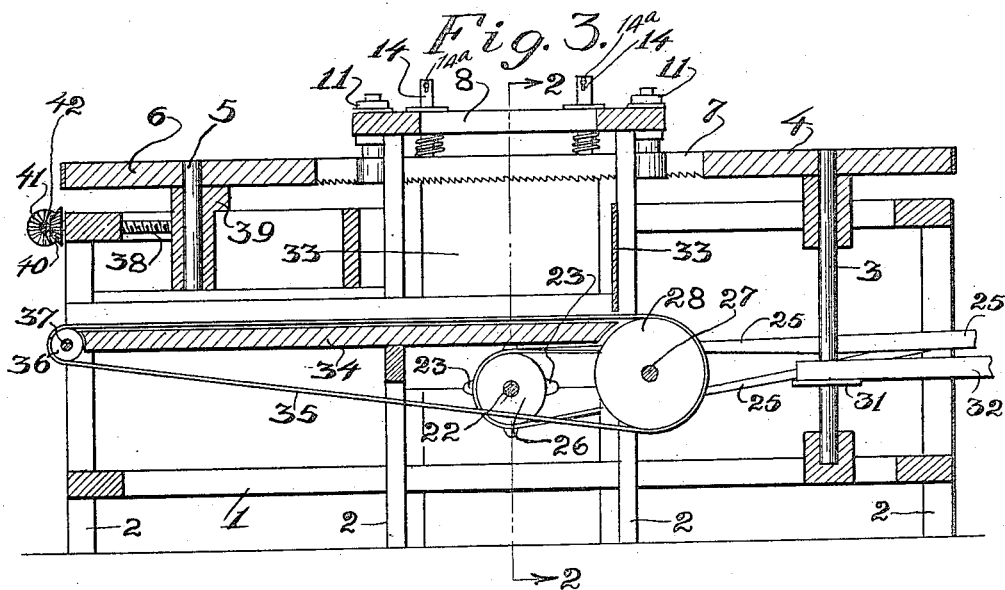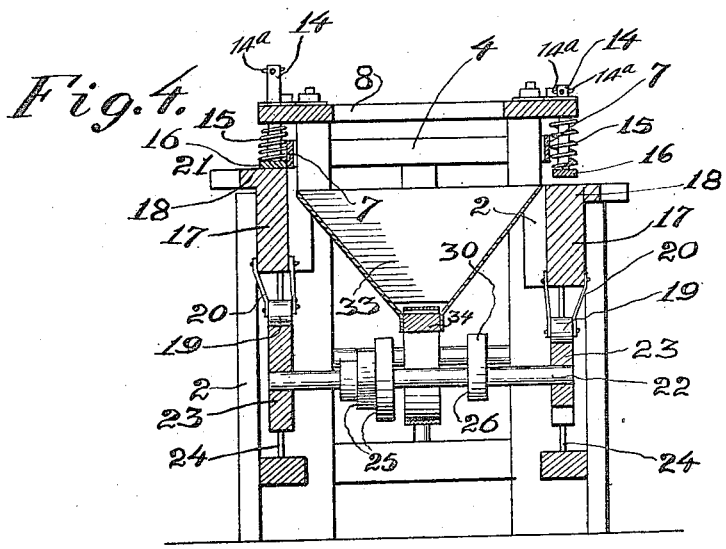

UNITED STATES PATENT OFFICE.

GEORGE J. BAYLIFF, OF AUGUSTA, ARKANSAS.

BAND-SAW MACHINE.

1,260,128.        Specification of Letters Patent.    Patented Mar. 19, 1918.

Application filed April 2, 1915.   Serial No. 18,800.

*To all whom it may concern:*

Be it known that I, GEORGE J. BAYLIFF, a citizen of the United States, residing at Augusta, in the county of Woodruff and State of Arkansas, have invented certain new and useful Improvements in Band-Saw Machines; and I do hereby declare the following to be a full, clear, and exact description of the invention, such as will enable others skilled in the art to which it appertains to make and use the same.

This invention relates to band-saw trimming machines, and one of the principal objects of the invention is to provide a machine which will saw two pieces of lumber simultaneously one on each side of the machine by a single band-saw.

Another object of the invention is to provide a double heading machine in which a single band-saw is used and which will make a smooth edge on two pieces of timber at the same time, and which will carry off the waste or blocks cut from the ends of the timber, and in which the work clamps are operated automatically.

Still another object of the invention is to provide a machine which will operate quickly and efficiently for sawing perfectly formed heading joints one upon each side of the machine at the same time.

The foregoing and other objects may be attained by means of the construction illustrated in the accompanying drawings, in which—

Figure 1:
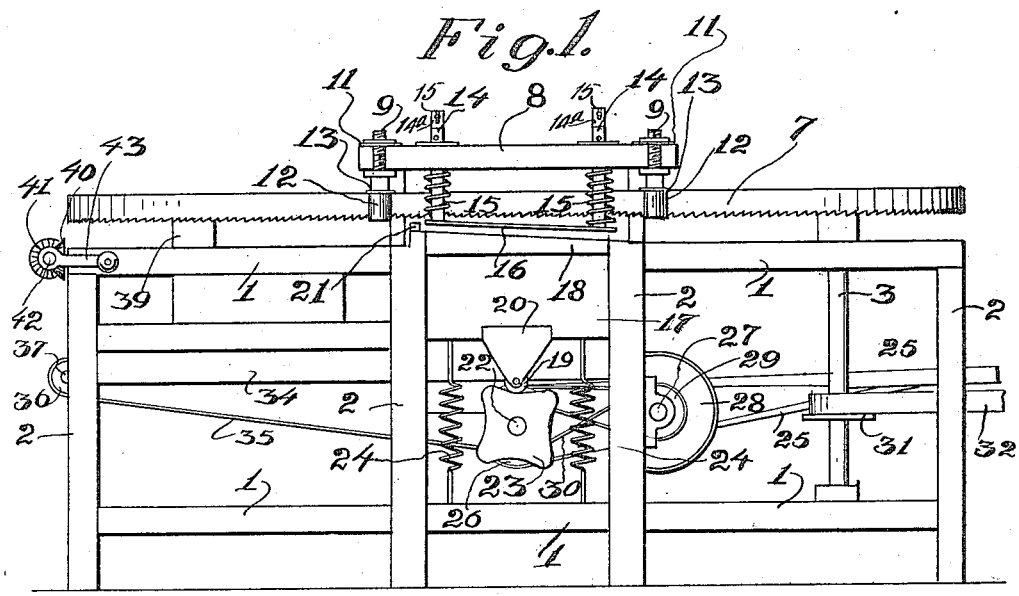
Figure 2:
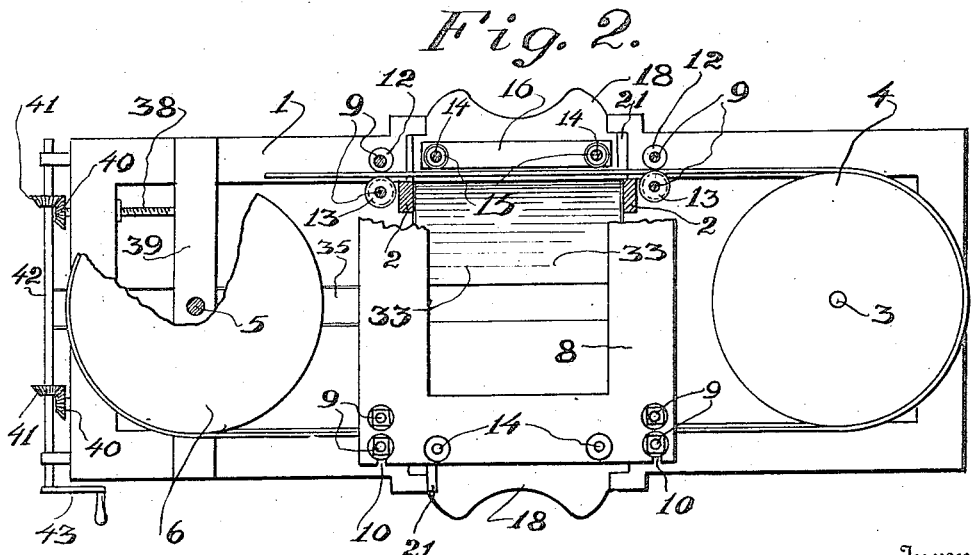

Figure 1 is a side elevation of a band-saw heading machine made in accordance with this invention, Fig. 2 is a top plan view of the same with a portion of one of the band-saw pulleys broken away, Fig. 3 is a longitudinal vertical sectional view of the same, and Fig. 4 is a transverse vertical sectional view taken on the line 2—2 of Fig. 3 looking in the direction indicated by the arrows.

Referring to the drawings, the numeral 1 designates the horizontal frame members, and 2 are the legs or uprights. A vertical shaft 3 is mounted in the frame and at its upper end is provided with a band-saw pulley 4. A stub-shaft 5 is mounted at the opposite end of the frame and provided with a band-saw pulley 6 and around the pulleys 4 and 6 a band-saw 7 extends.

The two central uprights 2 are extended beyond the top of the frame, and a rectangular table 8 is supported on the upper ends of the uprights 2. At each corner of the table 8 saw guides 9 are mounted in slots 10, said saw guides comprising screw threaded bolts which at their upper ends are provided with adjusting nuts 11. Rollers 12 are mounted to rotate on the bolts, and one of each pair of roller guides is provided with a flange 13 which projects beyond the periphery of the roller 12 to prevent upward movement of the band saw 7. The guides are adjustable in the slots 10. Extending through the table 8 at opposite sides of the machine are pins 14 each provided with an encircling spring 15, said pins carrying at their lower ends inclined clamp bars 16, the springs 15 being disposed between the table 8 and the clamp bars 16, and the pins 14 mounted to move in openings through the table 8. The pins 14 are held in position by suitable fastening elements 14$^a$ inserted through one of the apertures 15$^a$ formed in the pins 14.

Mounted in guide-ways in the central uprights 2 are sliding work clamp members 17, each having an inclined table portion 18 at the upper end thereof, while at the lower side, rollers 19 are mounted in suitable bearings 20. Upon the table portions 18 are edge guides 21. For raising and lowering the sliding clamp members 17, a shaft 22 is mounted in the frame and provided at opposite ends with a cam 23, which cams are engaged by the rollers 19, and as the shaft 22 rotates, the cams 23 raise the clamp members 17 against the lower side of the board or stuff to be headed, and press it up against the spring clamp members 16 upon opposite sides of the machine, and raise the work against the lower edge of the band-saw 7. The cams are so disposed that when one table will be up the other is down. For returning the clamp members 17 to their lowermost positions, springs 24 are connected at their upper ends to the members 17 and at their lower ends to the frame bar 1.

The shaft 22 is rotated by means of a belt 25 extending around a pulley 26 on the shaft 22 and leading to a source of power near the machine. A shaft 27 is mounted in the frame and provided with a pulley 28, and a smaller pulley 29 on the shaft 27 is connected by means of a belt 30 to the pulley 26, said belt being crossed, as shown in Fig. 1.

A pulley 31 on the shaft 3 is connected by a belt 32 to a counter-shaft (not shown).

Mounted in the center of the frame is a hopper 33 having an open lower end, and extending through the opening in the lower portion of the hopper is a conveyer support 34. A belt 35 extends over the top of the support 34 and surrounds the pulley 28 at one end and a pulley 36 mounted on a shaft 37 at the end of the frame. For adjusting the tension of the saw 7, screw threaded rods 38 are connected to a sliding frame 39 which carries the shaft 5 and the saw pulley 6. On the outer ends of the threaded rods 38 are beveled gear wheels 40 which are engaged by similar beveled gears 41 mounted upon a shaft 42 having a crank 43 on one end thereof for adjusting the sliding frame 39.

The operation of the machine may be briefly described as follows:

The lumber is placed upon the tables or supports 18 upon opposite sides of the machine, and with the edges of the lumber fed up against the edge gages 21; the ends are fed underneath the clamps 16, and the cams 23 will raise the work supporting clamps 17 alternately up to the lower edges of the band-saw 7 upon opposite sides of the machine and saw off a short section to provide a smooth edge on the lumber, the portions sawed off dropping down into the hopper 33 and being carried off by the endless belt 35. It will be obvious that the shaft 22 which carries the cams 23 is constantly rotated, and that the cams will raise the clamp members 17 into lumber engaging and releasing position.

Various changes may be made in the details of construction without departing from the spirit and scope of the invention as defined in the claims.

What is claimed is:—

1. In a sawing machine, a working clamp comprising a lower sliding member forming a work support, means to positively operate the same to bring it in operative and inoperative positions, an upper sliding member, spring means to normally hold the upper member in an extended position, and means to limit the downward movement of said upper member.

2. In a sawing machine, a working clamp comprising a lower sliding member forming a work support, an upper sliding member, spiral springs normally holding the upper clamp in an extended position, means to positively operate said lower member to force the same in engagement with the upper clamp and raise the same against the tension of said springs, and spring means normally holding the lower working clamp in positive engagement with said operating means.

3. In a sawing machine, a frame, a support positioned above said frame, a lower sliding working clamp positioned below said support, a shaft, a cam on said shaft, adapted to positively operate said lower member, contractile coil springs connecting the working clamp with the frame to normally hold the clamp in engagement with said cam, an upper sliding clamp, pins formed on said clamp extending through said support, and springs coiled around said pins for normally holding the upper clamp into extended position.

In testimony whereof I affix my signature in presence of two witnesses.

GEORGE J. BAYLIFF.

Witnesses:
  MARSHALL W. THOMPSON,
  CHRISTOPHER C. WIDNER.

Copies of this patent may be obtained for five cents each, by addressing the "Commissioner of Patents, Washington, D. C."